US008630185B1

(12) United States Patent
Frumkin et al.

(10) Patent No.: US 8,630,185 B1
(45) Date of Patent: *Jan. 14, 2014

(54) OPTIMIZING TRAFFIC IN A DATA NETWORK

(75) Inventors: Michael Alex Frumkin, Santa Clara, CA (US); Alok Kumar, Fremont, CA (US)

(73) Assignee: Google Inc., Mountain View, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 13/302,952

(22) Filed: Nov. 22, 2011

Related U.S. Application Data

(63) Continuation-in-part of application No. 13/233,362, filed on Sep. 15, 2011.

(51) Int. Cl.
*H04L 12/26* (2006.01)

(52) U.S. Cl.
USPC .............................. 370/238; 370/252; 370/389

(58) Field of Classification Search
USPC .............................. 370/238, 351, 352; 455/455
See application file for complete search history.

(56) References Cited

U.S. PATENT DOCUMENTS

| | | | | |
|---|---|---|---|---|
| 7,349,350 | B2* | 3/2008 | Liu | 370/255 |
| 2005/0031339 | A1* | 2/2005 | Qiao et al. | 398/4 |
| 2005/0060429 | A1 | 3/2005 | Massoulie et al. | |
| 2005/0088965 | A1* | 4/2005 | Atlas et al. | 370/216 |
| 2006/0268749 | A1 | 11/2006 | Rahman et al. | |
| 2007/0086361 | A1 | 4/2007 | Allan et al. | |
| 2007/0263592 | A1* | 11/2007 | Agarwal et al. | 370/351 |
| 2008/0168510 | A1* | 7/2008 | Small et al. | 725/100 |
| 2008/0279101 | A1* | 11/2008 | Wu et al. | 370/235 |
| 2010/0331002 | A1* | 12/2010 | Small et al. | 455/445 |

OTHER PUBLICATIONS

Tam et al., "Trimming the Multipath for Efficient Dynamic Routing", Department of Electrical and Computer Engineering, Sep. 5, 2011, 9 pages.
US Office Action in U.S. Appl. No. 13/233,362 dated Jun. 19, 2013.
David Eppstein, "Finding the k Shortest Paths", Department of Information and Computer Science, Mar. 31, 1997, pp. 1-26.
David Eppstein, "Finding the k Shortest Paths", Department of Information and Computer Science, Tech. Report 94-26, May 31, 1994, 23 pages.
Jin Y. Yen, "Finding the K Shortest Loopless Paths in a Network," Management Science, vol. 17, No. 11., Jul. 1971, pp. 712-716.
Jimenez et al., "A Lazy Version of Eppstein's K Shortest Paths Algorithm", 2003, pp. 179-191.

* cited by examiner

*Primary Examiner* — Gary Mui
(74) *Attorney, Agent, or Firm* — Foley & Lardner LLP; Edward A. Gordon (57) ABSTRACT

Systems and methods for optimizing traffic in a data network. Network traffic may be optimized by associating costs with data links that connect network nodes. A set of lowest cost paths between a source network node and a destination network node may be determined by analyzing paths in the data network. An explored path may be extended to another network node based on whether the other network node is able to reach the destination network node without forming a loop with the explored path.

20 Claims, 9 Drawing Sheets

OPTIMIZING TRAFFIC IN A DATA NETWORK

CROSS-REFERENCE TO RELATED APPLICATIONS

This application is a continuation-in-part of U.S. patent application Ser. No. 13/233,362, entitled "Optimizing Traffic in a Data Network," filed Sep. 15, 2011, the entirety of which is hereby incorporated by reference.

BACKGROUND

The present disclosure relates generally to optimizing traffic in a data network, and more particularly, to determining a plurality of lowest cost paths for routing data from a source network node to a destination network node.

Data networks may include any number of routers and other devices that direct the transmission of data from one location to another. For example, a source network node (e.g., a computer, a server, a data center, a router, etc.) may transmit data to a destination network node (e.g., another computer, data center, router, etc.) via the data network using any number of different paths. Each data link in a given path may also have a number of associated characteristics (e.g., latency, bandwidth, financial cost, etc.). These characteristics can be used to optimize how the data is transmitted from the source network node to the destination network node.

SUMMARY

Implementations of systems and methods for optimizing traffic in a data network are described herein. One implementation is a method that includes retrieving, from a memory, map data identifying a plurality of network nodes and a plurality of data links between the network nodes. Each data link has an associated cost. The method also includes receiving an identification of a source network node and a destination network node in the plurality of network nodes. The method further includes determining, by a processing circuit, a set of lowest cost paths between the destination network node and each other network node of the plurality based in part on the associated costs of the plurality of data links. The method also includes determining, by the processing circuit, a set of explored paths based in part on the difference between the map data and the set of lowest cost paths between the plurality of network nodes and the destination network node. The method additionally includes determining, by the processing circuit, a set of lowest cost paths from the source network node to the destination network node by extending one or more of the explored paths based in part on whether one of the plurality of data links is a valid path extension for an explored path.

Another implementation is a processing circuit configured to retrieve map data identifying a plurality of network nodes and a plurality of data links between the network nodes. Each data link has an associated cost. The processing circuit is configured to receive an indication of a source network node and a destination network node in the plurality of network nodes. The processing circuit is also configured to determine a set of lowest cost paths between the destination network node and each other network node of the plurality based in part on the associated costs of the plurality of data links. The processing circuit is further configured to determine a set of explored paths based in part on the difference between the map data and the set of lowest cost paths between the plurality of network nodes and the destination network node. The processing circuit is also configured to determine a set of lowest cost paths from the source network node to the destination network node by extending one or more of the explored paths based in part on whether one of the plurality of data links is a valid path extension for an explored path.

A further implementation is one or more computer-readable media having instructions stored therein, the instructions being executable by one or more processors to cause the one or more processors to perform operations. The operations include receiving map data identifying a plurality of network nodes and a plurality of data links between the network nodes. Each data link has an associated cost. The operations also include receiving an identification of a source network node and a destination network node in the plurality of network nodes. The operations further include determining a set of lowest cost paths between the destination network node and each other network node of the plurality based in part on the associated costs of the plurality of data links. The operations also include determining a set of explored paths based in part on the difference between the map data and the set of lowest cost paths between the plurality of network nodes and the destination network node. The operations further include determining a set of lowest cost paths from the source network node to the destination network node by extending one or more of the explored paths based in part on whether one of the plurality of data links is a valid path extension for an explored path.

These implementations are mentioned not to limit the scope of the disclosure, but to provide examples to aid in understanding thereof. Particular implementations can be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

According to some aspects of the present disclosure, a plurality of lowest cost paths between a source network node and a destination network node in a data network can be found by generating a map of the network and traversing data links. Each data link may have one or more properties or characteristics (e.g., latency, bandwidth, financial cost, etc.), referred to herein as costs, that can be used to associate a cost to sending data over a particular data link. The map of the data network can be traversed to analyze the cost of taking different paths from a source network node to a destination network node. In some implementations, paths that contain loops may be excluded by determining whether an extension of an explored path to another network node is valid, given certain constraints. For example, one set of constraints may be that the other network node is able to reach the destination network node without forming a loop with the explored path. In this way, the plurality of lowest cost paths between the source network node and the destination network node may be generated to contain only paths that are loopless.

Figure 1:
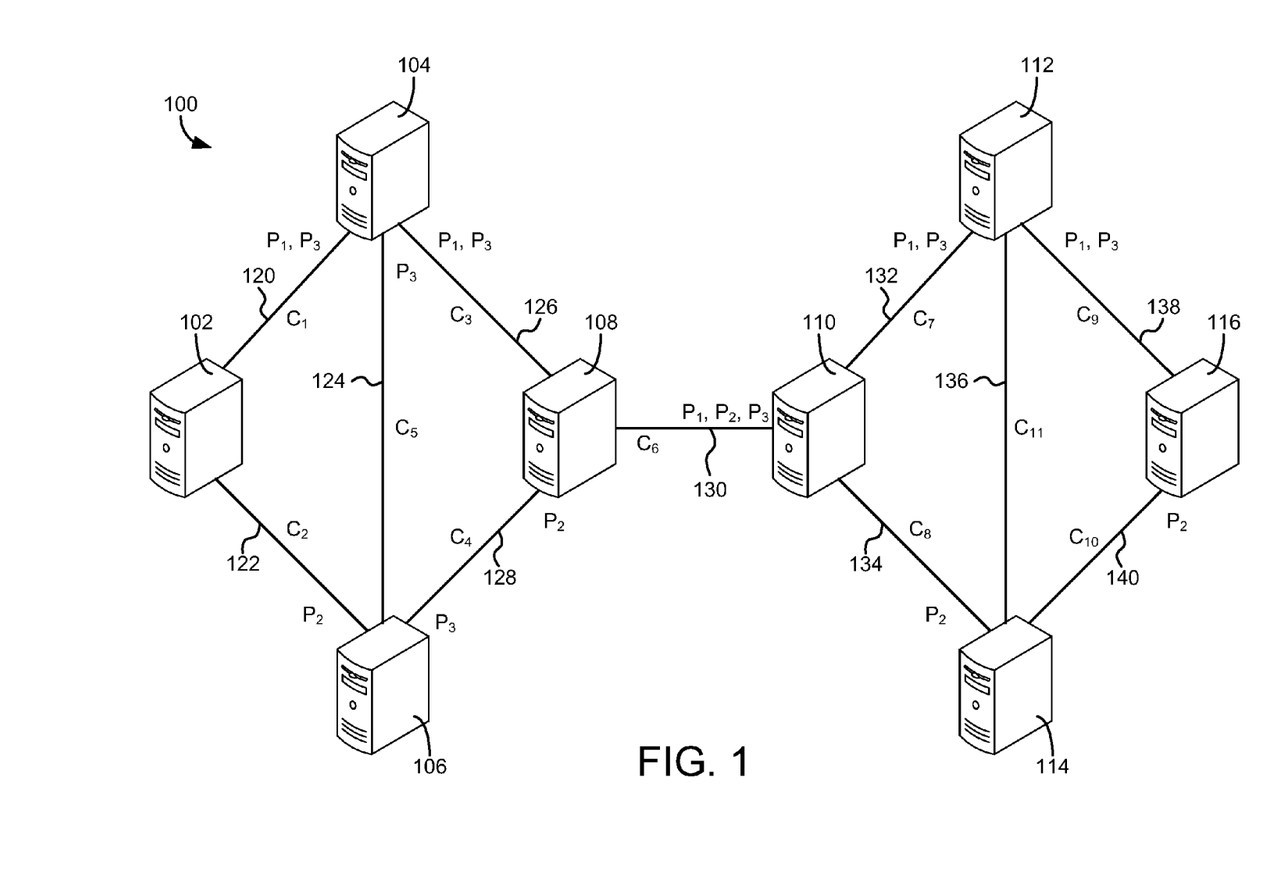
FIG. 1 is an illustration of an example of a data network.

FIG. 1 shows an illustration of an example data network 100. Data network 100 includes a plurality of network nodes 102-116 connected by data links 120-140. Each of network nodes 102-116 may be one or more electronic devices configured to transmit data within data network 100. For example, each of network nodes 102-116 may include one or more data centers, servers, computers, routers, switches, mobile devices, and/or other computing devices.

Data network 100 is also shown to include data links 120-140, which allow data to be transmitted between network nodes 102-116. For example, network node 102 may transmit data to network node 104 via data link 120. Data links 120 may be any type of hardwired and/or wireless data connection. For example, data link 120 may be a hardwired fiber optic line or a wireless satellite connection that conveys data from network node 102 to network node 104. Data links 120-140 may be bidirectional or unidirectional. For example, data link 138 may be a bidirectional link that allows network node 112 to convey data to network node 116 and vice versa. In another example, data link 120 may be a unidirectional link that only allows data to be transmitted from network node 102 to network node 104.

Each of data links 120-140 is shown to have an associated cost, denoted $c_1$-$c_{11}$ in FIG. 1. Costs $c_1$-$c_{11}$ may be one or more values associated with the characteristics of data links 120-140 and/or network nodes 102-116. In one example, costs $c_1$-$c_{11}$ may be related to the speed of data links 120-140. For example, costs $c_1$-$c_{11}$ may be the one-way or round-trip latency experienced by a data link when data is sent from one network node to another. Latency may be measured by sending a "ping" (e.g., a transmission of data) from a network node across one of data links 120-140 and measuring the amount of time taken for the data to reach the other network node connected to the data link. In other examples, any number of characteristics of data links 120-140 (e.g., bandwidth, affinities, financial cost, usage capacity, etc.) may be used to calculate costs $c_1$-$c_{11}$.

The transmission of data from a source network node to a destination network node in data network 100 may follow any number of different paths. In general, a path may be an ordered set of data links and/or network nodes that are connected by data links. By way of example, network node 102 (e.g., a source network node) may attempt to send data to network node 116 (e.g., a destination network node) via data network 100. The data may be routed over a number of different paths. For example, one path, $P_1$, may include data links 120, 126, 130, 132, and 138. Another path, $P_2$, may include data links 122, 128, 130, 134, and 140. Each potential path may also have an associated cost. For example, path $P_1$ may have a cost $c_x$ that is the sum of costs associated with its data lines (e.g., costs $c_1$, $c_3$, $c_6$, $c_7$ and $c_9$). Similarly, path $P_2$ may have cost $c_y$ that is the sum of costs associated with its own data lines (e.g., costs $c_2$, $c_4$, $c_6$, $c_8$, and $c_{10}$).

Traffic routing decisions in data network 100 can be made by determining the lowest cost path to route data from a source network node to a destination network node. For example, the cost of Path $P_1$ is less than the cost of path $P_2$ (i.e., $c_x<c_y$), network 100 may route traffic from network node 102 to network node 116 via path $P_1$. For each source-destination pair, a different lowest-cost path may be determined and used by network 100 to route data. This allows the traffic in data network 100 to always take the optimal route, thereby improving the performance of network 100.

A number of different techniques can be used to determine which path has the lowest cost. This type of problem may be referred to as the single shortest path problem. However, this name is a misnomer in cases where the costs are not actual distances between nodes. More correctly, this type of problem seeks to find the path from a source network node to a destination network node that has the lowest cost path.

A related, and more complex, problem relates to finding not only the lowest cost path, but a set of the lowest cost paths between a source network node and a destination network node. Sometimes called the k-shortest path problem, the goal in this problem is to find not only the path having the overall lowest cost, but the set of lowest cost paths from the source network node to the destination network node up to the $k^{th}$ lowest cost path, k being any positive integer greater than one. These types of problems require significantly more computational time and resources than for finding just the overall lowest cost path from one node to another.

In data networks, the set of lowest cost paths between a source network node and a destination network node can be used in the network to adapt to changing network conditions. For example, path $P_1$ in data network 100 may be of lower cost than path $P_2$. However, if data link 138 becomes unavailable, path $P_1$ is no longer the optimal route and traffic must be rerouted around data link 138. In such a case, the next lowest cost path (e.g., path $P_2$ or another path) may be used instead to route data from network node 102 to network node 116. This allows network 100 to continue to route data in an optimal way, even when the network conditions change.

In one example, data network 100 may be part of a class of networks that dynamically control network traffic using the costs associated with data links 120-140. For example, data network 100 may be a multiprotocol label switching (MPLS) network, according to one implementation. In MPLS networks, labels are assigned to data packets at a first router known as a label edge router (LER). The appended labels contain path information used to route data throughout the network. The path corresponding to the label is often called a label switched path (LSP). Label switching routers (LSRs) receive the labeled data packets in MPLS networks and make routing decisions based on the content of a label. In such a case, the set of lowest cost paths from a source network node to a destination network node can be used to select an appropriate LSP to route the sent data.

In addition to finding a set of lowest cost paths between a source network node and a destination network node in data network 100, another constraint may be that the set of lowest cost paths between the source network node and the destination network node contain only loopless paths. A loopless path is any path that passes through a single network node only once. For example, the path $P_3$ formed by data links 120, 126, 128, 124, 126, 130, 132, and 138 contains a loop because path $P_3$ passes through network node 104 twice. In general, this means that a network node (e.g., network node 104) transmits data to one source, only to receive it again, and then has to retransmit it to a different source. Therefore, paths containing loops may be avoided from inclusion in the set of lowest cost paths between the source network node and the destination network node in some cases, to prevent making redundant or unnecessary data transmission.

In some situations, a path containing a loop may still be within the set of lowest cost paths between the source network node and the destination network node, due to higher costs associated with alternative paths. For example, if path $P_1$ is the overall lowest cost path having a cost of $c_x$, path $P_3$ may have a cost of $c_z$ equal to the sum of $c_x$, $c_3$, $c_4$, and $c_5$. If the cost of path $P_3$ is less than that of path $P_2$ (i.e., $c_z < c_y$), path $P_2$ may be included in the set of lowest cost paths before $P_3$, even though path $P_2$ contains a loop. Therefore, some implementations of the optimization techniques disclosed herein may further detect the presence of loops and exclude paths containing loops from the set of lowest cost paths between the source network node and the destination network node.

Figure 2:
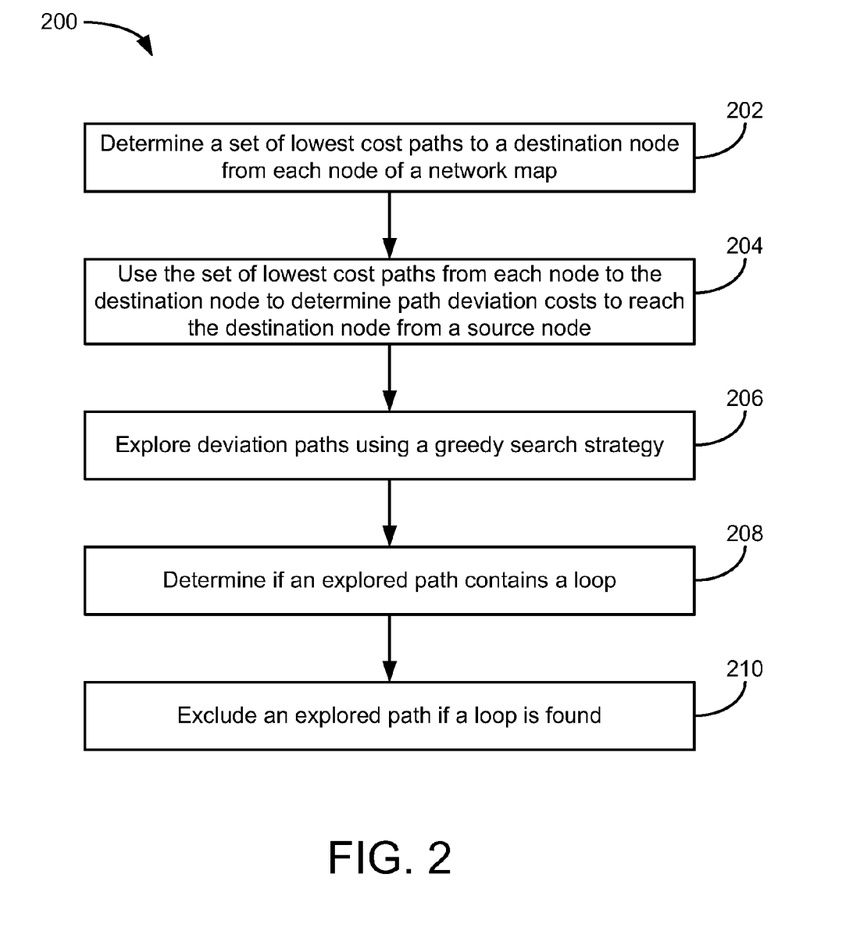
FIG. 2 is a flow diagram of an example process for determining a set of loopless, lowest cost paths from a source network node to a destination network node in a data network.

Referring now to FIG. 2, an example process 200 for determining a set of loopless, lowest cost paths from a source network node to a destination network node in a data network is shown. The set of loopless, lowest cost paths between the source network node and the destination network node includes two or more lowest cost paths over which data can be sent from the source network node to the destination network node. The paths in the set are also loopless, meaning that each path traverses any given network node at a maximum of one time.

Process 200 includes determining a set of lowest cost paths to a destination network node from each node of a network map (block 202). In general, the set of lowest cost paths from each node to a destination network node includes the overall lowest cost paths from each individual node in the network map to the destination network node. On each path, the cumulative cost to reach the destination network node from a given node is assigned to the given node. This cumulative cost corresponds to the sum of costs associated with the data links traversed in the path. In other words, the set of lowest cost paths from each node to a destination is a combination of the overall lowest cost paths from each node in the network map to the destination network node.

The set of lowest cost paths from each node to the destination network node differs from that of the set of lowest cost paths from a source network node to the destination network node. The set of lowest cost paths to the destination network node contains the overall lowest cost path from each node of the network to the destination network node. This set includes the overall lowest cost path from the source network node to the destination network node. In contrast, the set of lowest cost paths between the source network node and the destination network node includes not only the overall lowest cost path from the source network node to the destination network node, but also the next k−1 lowest cost paths (e.g., the second lowest cost path, the third lowest cost path, etc.) between the source network node and the destination network node.

A set of lowest cost paths from each node to a destination network node may be generated in some implementations by performing a single source shortest path search strategy from each node in the network. The lowest cost path from each node to the destination network node can then be used to construct the set of lowest cost paths to a destination. In some implementations, the data links may be reversed and a search strategy that originates from the destination network node can be used to construct the set of lowest cost paths from each node to a destination. In either case, the constructed set of lowest cost paths from each node to the destination network node provides the lowest cost path from any given node to the destination network node. Given a source network node, this allows the lowest cost path from the source to the destination to be determined by finding the corresponding path from the source to the destination in the set of lowest cost paths from each node to the destination network node. The set of lowest cost paths from each node to the destination network node also allows the total cost of the lowest cost path from any network node to be determined using the properties of the node in the set of lowest cost paths from each node to the destination network node.

Process 200 includes using the set of lowest cost paths from each node to the destination to determine path deviation costs to reach the destination network node from a source network node (block 204). Since the set of lowest cost paths from each node to the destination includes the lowest cost path from the source to the destination, any deviations from this path incurs a greater cost than if the lowest cost path between the source and destination is taken. These deviation costs can be determined using the costs associated with the data links that are not part of the lowest cost path between the source and the destination. For example, the deviation paths for the network map can be determined by taking the difference between the network map and the set of lowest cost paths between each node and the destination.

One way to determine the set of lowest cost paths between the source and destination network nodes is to begin with the assumption that most, if not all, of the paths in the set are slight deviations from the overall lowest cost path from the source to the destination. Therefore, deviation paths from the overall lowest cost path can be explored to find additional low cost paths from the source to the destination. This exploration can be repeated for various deviation paths until the desired number of lowest cost paths between the source network node and the destination network node are discovered.

Process 200 includes exploring deviation paths using a greedy search strategy (block 206). In general, greedy search strategies operate by making a choice that optimizes the solution at each decision point. For example, at any given node with two potential data links to explore, the search strategy may choose to always explore the lowest cost data link. Any number of path searching strategies may be utilized. For example, a path searching strategy that utilizes a sorted heap of paths is described in the article by David Eppstein, entitled "Finding the k Shortest Paths," published in the 35th IEEE Symposium Foundations of Computer Science (1994).

Process 200 includes determining if an explored path contains a loop (block 208). In some implementations, a check may be made at a node of a potential path extension to determine if a node or a data link is already present in the currently explored path. For example, a path may be explored from nodes A to B to C. A check may then be made to ensure that the next traversed path does not lead from node C back to nodes A or B. This may be done either by actually traversing the data link or by only examining the direction of the data link. For example, if the data link goes from C to B, the link may be traversed back to node B. Since node B is already in the set of explored nodes, this indicates that the currently explored path contains a loop. In another example, the data link from C to B may be explored itself, without actually traversing the link. Since the data link itself indicates that it leads to node B, the endpoint of the data link may be used to determine that node B has already been explored and that a loop exists. In some implementations, a check may be made to ensure that the network node in the potential path extension is able to reach the destination network node without forming a loop with the explored path.

Process 200 includes excluding an explored path if a loop is found (block 210). If an explored path is determined to contain a loop in step 208, the explored path may be flagged or otherwise excluded from inclusion in the set of lowest cost paths. Although a loop-containing path may have a lower cost than other paths from the source network node to the destination network node, it may be excluded in some implementations. Data transmission over a loop is redundant and does not offer any routing advantages over using only its base path (e.g., the loop-containing path minus the loop). In some implementations, exploration of the current path may also terminate when a loop is found (e.g., by not extending the explored path to another node). In such a case, other paths may be evaluated, instead.

Figure 3:
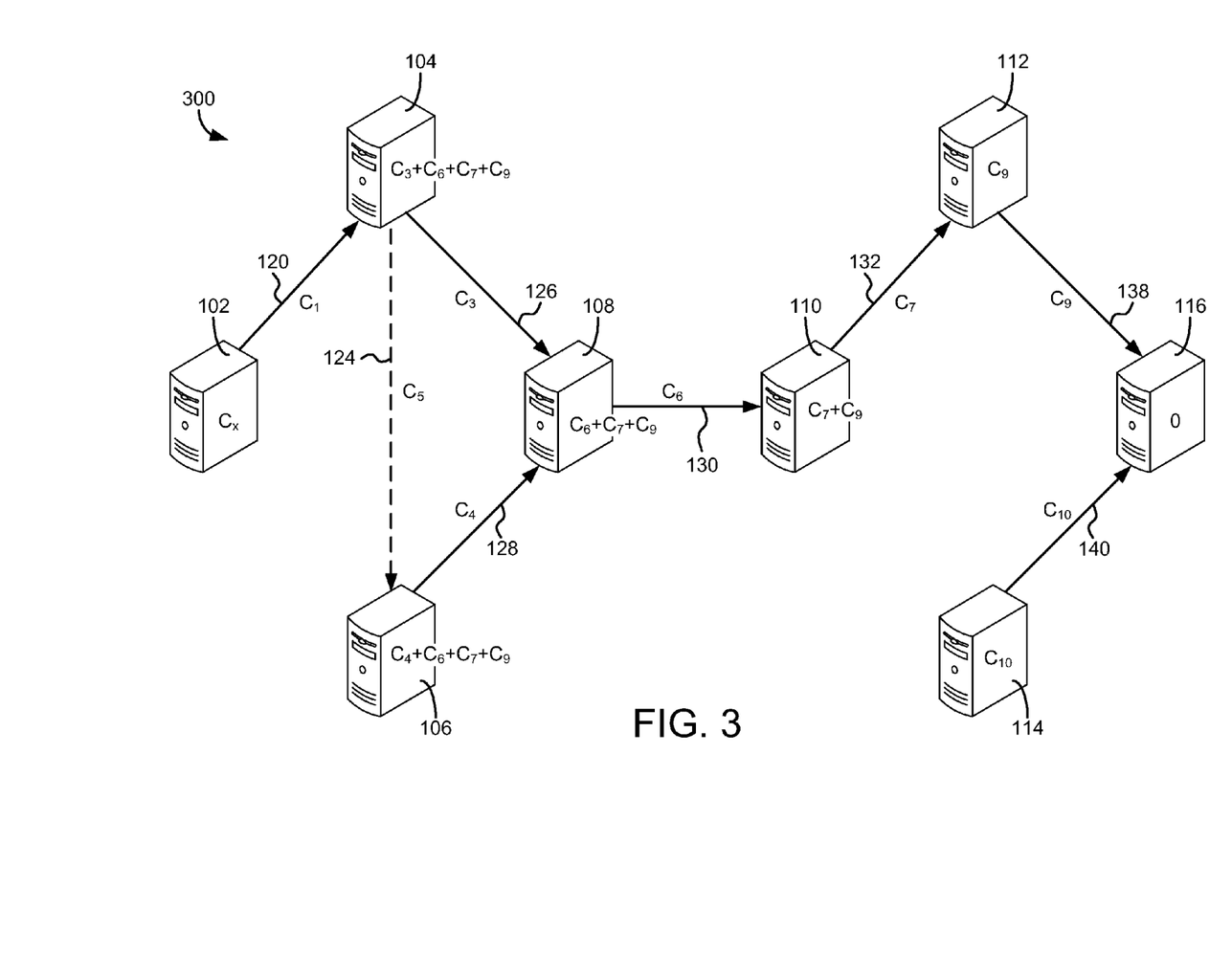
FIG. 3 is an illustration of an example set of lowest cost paths from each node of the data network shown in FIG. 1 to a destination network node.

FIG. 3 shows a set of lowest cost paths from each node in a network to a destination network node is shown, according to one example. As shown, set 300 is constructed using the map of data network 100 in FIG. 1 with network node 116 as the destination network node. For each network node 102-116 in data network 100, the lowest cost path to network node 116 is determined. In some implementations, set 300 may be constructed by starting at each of network nodes 102-114 and finding the lowest cost path to network node 116. For example, two potential paths may be taken from network node 104 to network node 108. In one path, data links 124 and 128 are traversed from network node 104, having an associated cost of $c_4+c_5$. In another path, data link 126 is traversed, having an associated cost of $c_3$. As shown, traversing data link 126 has a lower associated cost (e.g., $c_3<c_4+c_5$). Therefore, data link 124 is excluded from set 300 and data link 126 is included. In other implementations, set 300 may be constructed by reversing data links 120-140 and finding the single source shortest path from network node 116 to each of network nodes 102-114. Set 300 may be constructed, for example, using the single-source shortest path search techniques proposed by Edsger Dijkstra or variants thereof (e.g., utilizing a Fibonacci heap as a priority queue, etc.).

A cumulative cost may be maintained for each of network nodes 102-116 in set 300. The cumulative cost represents the total cost from the node when traversing the lowest cost path to the destination, i.e., network node 116. The cumulative cost may be determined, for example, by summing the costs of the data links in the path from the given network node to the destination. For example, data link 140 has an associated cost $c_{10}$ and is also the lowest cost path between network node 114 and network node 116. Therefore, the cumulative cost for network node 114 is equal to $c_{10}$. In another example, the cumulative cost at network node 108 is equal to the sum of costs for data links 130, 132, and 138 because each of these data links are in the lowest cost path between network node 108 and network node 116.

Figure 4:
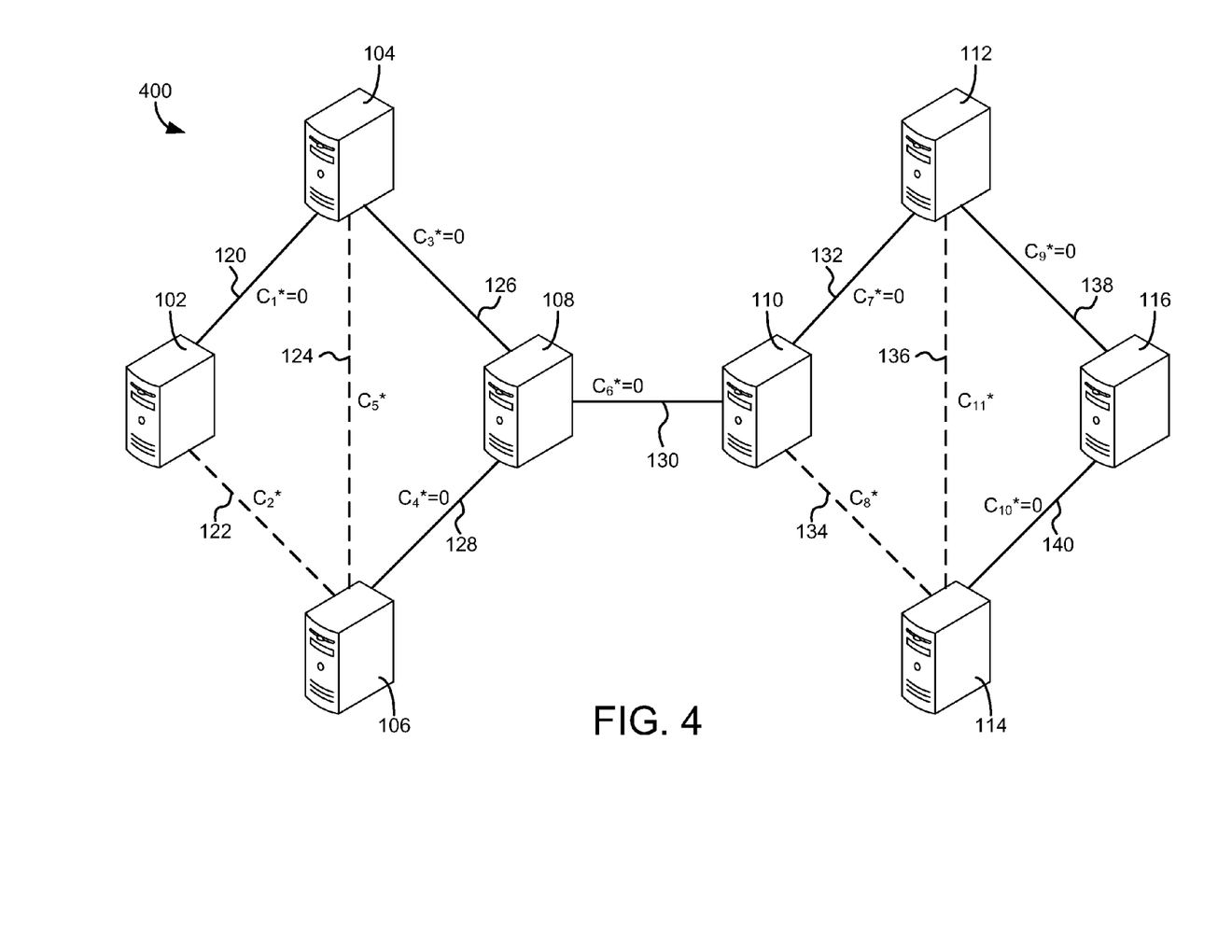
FIG. 4 is an illustration of the set of lowest cost paths from each network node to a destination from FIG. 3 showing overlaid path deviations and updated costs.

FIG. 4 shows a set of lowest cost paths between network nodes and a destination network node is shown with overlaid path deviations, according to another example. A map 400 may be constructed using set 300 in FIG. 3 and data network 100 in FIG. 1. Map 400 includes one or more sets of network nodes and/or one or more sets of data links with updated costs. For example, map 400 may be stored in one or more data structures, such as a table, queue, list, etc. As shown, the costs associated with the data links in map 400 have been updated to reflect the cost of deviating from the lowest cost paths in set 300 (denoted as c: in FIG. 4). For example, the costs associated with data links 120, 126, 128, 130, 132, 138, and 140 have been updated in map 400 to each be zero. Since it is already know that the lowest cost path from any of network nodes 102-114 to the destination network node 116 is given by set 300, any return to these nodes while exploring a path deviation will incur no additional cost.

Overlaid on map 400 are data links 122, 124, 134, and 136, which are path deviations from that of set 300. Although set 300 provides the overall lowest cost path from source network node 102 to destination network node 116, other paths should still be explored to find the other lowest cost paths up to the $k^{th}$ lowest cost path. This may be done by exploring the effects of deviating from the path between the source network node and the destination network node in set 300.

Similar to the data links in set 300, the costs associated with data links 122, 124, 134, and 136 (i.e., the path deviations) may be updated to reflect the cost of deviating from the path between the source and destination in set 300 (e.g., the overall lowest cost path between the source and destination). For example, the costs may be updated as follows:

$$c_i^* = c_i + d(e\_dst) - d(e\_src)$$

where $c_i$ is the original cost of the data link, e_src is the tail of the data link, e_dst is the head of the data link (i.e., data flows from the tail to the head of the data link), d(e_dst) is the overall lowest cost to the destination from the tail of the data link, and d(e_src) is the overall lowest cost to the destination from the head of the data link. Both d(e_dst) and d(e_scr) may be determined, for example, using the overall lowest cost associated with the respective nodes of the data link in set 300.

In one example of updating the cost for a path deviation, the cost of data link 122 may be updated in map 400 using the overall lowest cost the to destination from set 300 with the original cost of the data link from data network 100. This cost represents the added cost of deviating from the overall lowest cost path between the source and destination in set 300. The overall lowest cost to reach the destination network node 116 from network node 106, i.e., d(e_src), is $c_4+c_6+c_7+c_9$, as shown in set 300. Similarly, the overall lowest cost to reach the destination network node 116 from network node 102 is $c_x = c_1+c_3+c_6+c_7+c_9$, also shown in set 300. This gives an updated cost for traversing data link 122 in map 400 of:

$$c_2^* = c_2 + (c_4+c_c+c_7+c_9) - (c_1+c_3+c_6+c_7+c_9) = c_2+c_4-c_1-c_3$$

Such a cost value allows the added cost of transmitting data over data link 122 instead of data link 120 to be quantified.

The updated costs for the path deviations in map 400 are as follows:

TABLE 1

| Path Deviation | Direction of Data Flow | Updated Cost |
| --- | --- | --- |
| data link 122 | node 102 to node 106 | $c_2 + c_4 - c_1 - c_3$ |
| data link 124 | node 106 to node 104 | $c_5 + c_3 - c_4$ |
| data link 134 | node 110 to node 114 | $c_8 + c_{10} - c_7 - c_9$ |
| data link 136 | node 114 to node 112 | $c_{11} + c_9 - c_{10}$ |

In addition to the path deviations listed in Table 1, more path deviations may exist if any of data links 120-140 in map 400 are bidirectional. For example, if data link 124 also allows data flow from network node 104 to network node 106, the updated cost associated with this data transmission would be $c_5+c_4-c_3$. Similarly, reversal of the flow of data across any of the data links in set 300 could also be categorized as a path deviation. For example, transmitting data from network node 110 to network node 108 via data link 130 would be $c_6+c_6$, since the data would need to retraverse data link 130 to reach destination network node 116.

A number of different search strategies may be employed to explore the path deviations. For example, the updated costs for the path deviations may be sorted and used to determine which paths are explore first to generate the set of lowest cost paths. In another example, path deviations may be explored starting from the source network node or another reference node in the data network. For example, data link 122 may be explored first as a possible alternative route from source network node 102 to destination network node 116.

During exploration of the map, path deviations that lead to loops may also be excluded from further exploration. In one example, data links in map 400 may be explored in the following order: data link 120, data link 124, data link 122. Since network node 102 has already been explored along this path, a loop has been reached and the path may be excluded from being added to the set of lowest cost paths. Further exploration of the path (e.g., by following data link 120, data link 126, etc.) may also be excluded, in some implementations. In some implementations, an explored path may only be extended to another network node if the other network node is able to reach the destination network node without forming a loop with the explored path.

Figure 5:
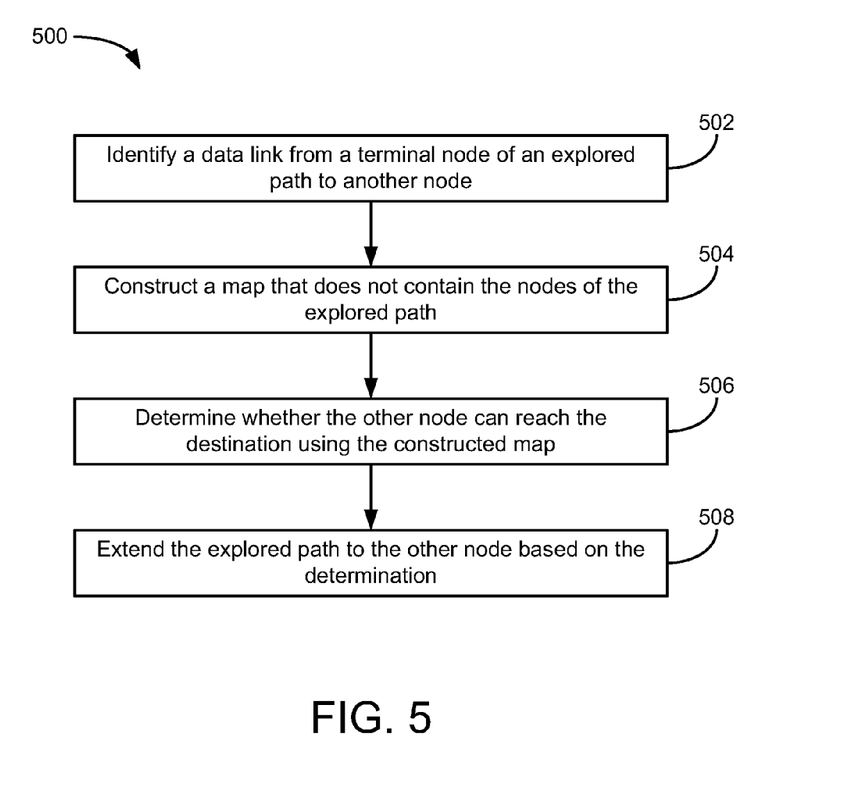
FIG. 5 is an illustration of an example process for exploring deviation paths.

Referring now to FIG. 5, a process 500 for exploring deviation paths is shown, according to one example. In some implementations, a set of path deviations may be determined using a set of lowest cost paths to the destination network node from each network node. The costs associated with the deviation paths may also be adjusted by comparing the original network to the set of lowest cost paths to the destination network node from each network node. In such a case, a greedy search strategy may be used to determine the set of lowest cost paths from the source network node to the destination network node. For example, a priority queue of explored paths (e.g., a sorted heap or other data structure) may be maintained in an electronic memory. In some implementations, the priority may be based on the cost of the explored path. A tie breaker may also be employed if the costs are equal. For example, network nodes or data links may be sorted lexicographically, in addition to cost. Lexicographic sorting provides an ordering based on the arrangement of characters in a name or identifier associated with a data link. The explored path having the highest priority in the queue is then evaluated to determine whether it can be extended to additional network nodes. If so, the extended path is added to the queue and the process continues in a greedy fashion until the queue is either empty (i.e., there are no more paths to explore) or a predefined number of lowest cost paths from the source network node to the destination network node are found.

Process 500 includes identifying a data link from a terminal network node of an explored path to another network node (block 502). An explored path begins at the source network node and ends at a terminal network node, which may be any other node in the network. If the terminal network node is the destination network node, then the explored path is a solution path (i.e., one of the set of lowest cost path from the source network node to the destination network node). If the terminal network node is not the destination network node, then the terminal network node may be connected by a data link to another network node (i.e., a data link that begins at the terminal network node of the explored path and ends at another network node). If such a data link exists, it may be identified as a possible data link over which the explored path may be extended.

Process 500 includes constructing a map that does not contain the nodes of the explored path (block 504). In some implementations, a condition of the system may be that the set of lowest cost paths from the source network node to the destination network node must not contain loops. A map that does not contain the nodes of the explored path may be used to impose such a condition. By definition, such a constructed map also does not contain data links to any of the nodes of the explored path. Therefore, the set of data links in the constructed map corresponds to those data links that cannot be used to extend the explored path back to itself and forming a loop.

Process 500 includes determining whether the other node can reach the destination using the constructed map (block 506). There are two possibilities if the other network node is unable to reach the destination network. The first possibility is that a path may not exist from the other network node to the destination network node. The second possibility is that there exists a path from the other network node to the destination network node, but that such a path requires a loop containing one or more of the nodes of the explored path. In either case, extending the explored path to the other network node would not help to find the set of loopless, lowest cost paths from the source network node to the destination network node. Therefore, extension of the explored path to the other network node may be prevented if the other network node is unable to reach the destination network node in the constructed map.

Process 500 includes extending the explored path to the other node based on the determination (block 508). If the other network node is able to reach the destination network node in the map omitting the nodes of the explored path, a new path may be constructed by joining the explored path to the data link between the terminal network node of the explored path and the other network node. If a priority queue is used to order paths to be explored, the cost associated with the extended path may be determined by adding the cost of the explored path to that of the data link between the terminal network node and the other network node. The extended path may then be inserted into the queue, which uses the cost of the extended path and/or other factors (e.g., a lexicographical rank, etc.) to determine which path is to be evaluated next for possible extension.

Figure 6:
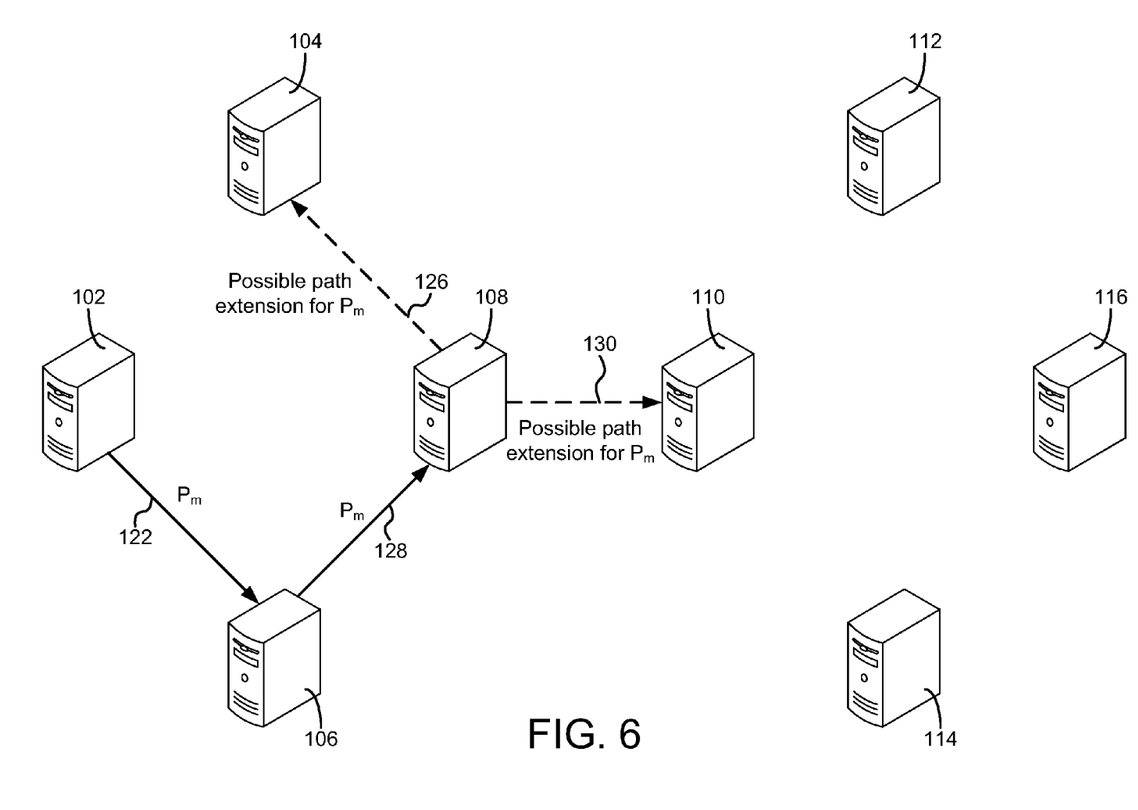
FIG. 6 is an illustration of an example of possible path extensions for an explored path.

FIG. 6 is an illustration of an example of possible path extensions for an explored path $P_m$. As a greedy search is performed, explored paths are evaluated based on their associated costs. An explored path in the set of explored paths having the lowest cost becomes the next path eligible for extension. As shown, an explored path $P_m$ may be the next path eligible for extension, based on its current associated cost. For example, explored path $P_m$ may have an associated cost $c_2^*$, as shown in FIG. 4. Explored path $P_m$ connects source network node 102 to network node 108 via network node 106 and includes directed data links 122 and 128. In such a case, network node 108 is the terminal network node for explored path $P_m$.

Terminal network node 108 may have data links from which it is the start network node (e.g., terminal network node 108 transmits data over a data link to another network node). For example, terminal network node 108 may transmit data to network node 110 over data link 130. Terminal network node 108 may also transmit data to network node 104 over data link 126. Therefore, both data link 126 and data link 130 may be identified as potential data links through which explored path $P_m$ may be extended. In some implementations, the order of evaluation of data links 126 and 130 as possible expansions may be based on their associated costs. For example, if the associated cost to traverse data link 130 is less than that of data link 126, data link 130 may be evaluated, first. Conversely, if the associated cost of data link 126 is less than that of data link 130, data link 126 may be evaluated first for possible expansion. In this way, the search strategy operates in a greedy manner to find the next lowest cost path from source network node 102 to destination network node 116.

Figure 7:
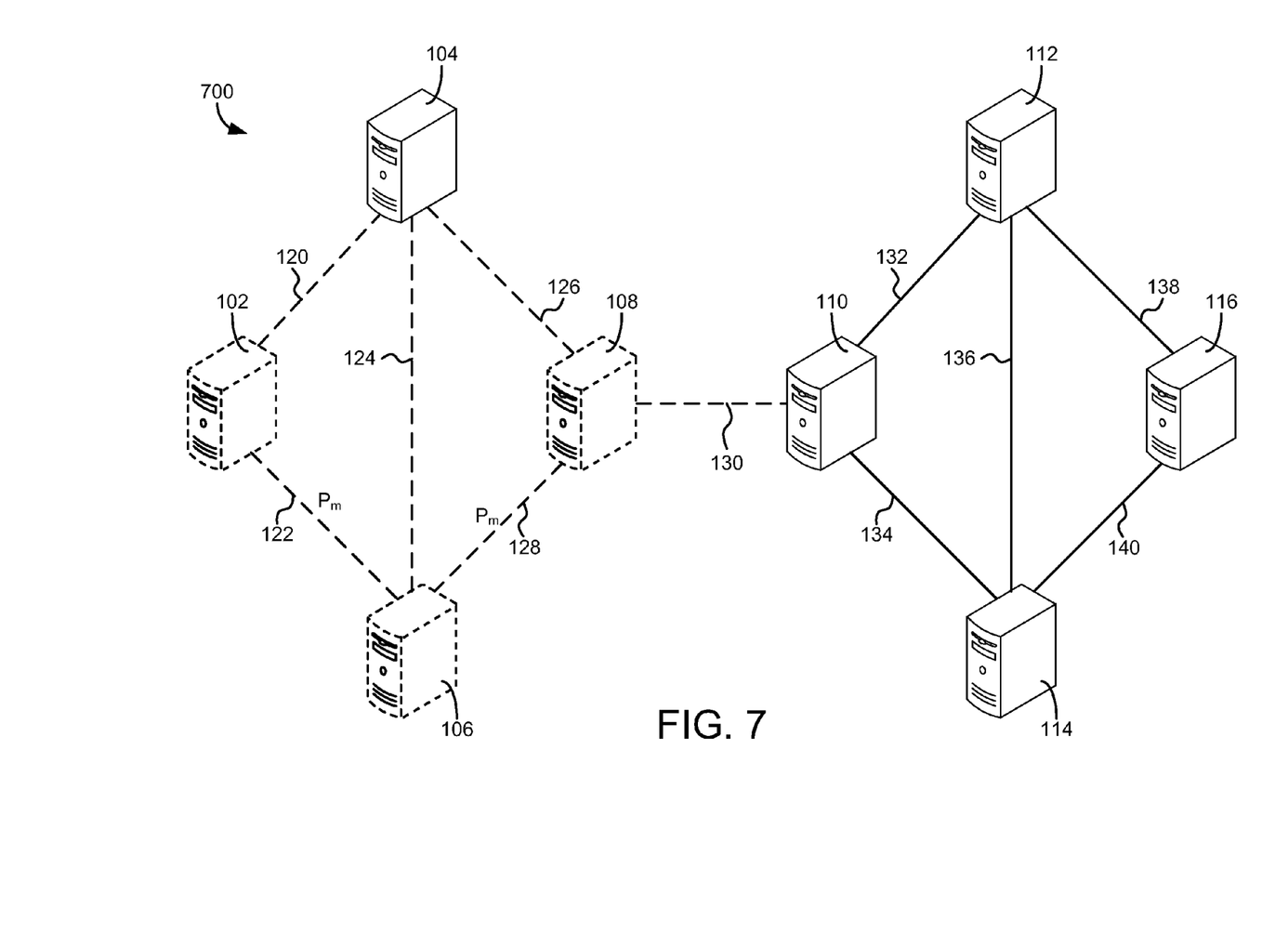
FIG. 7 is an illustration of an example of evaluated path extensions.

FIG. 7 is an example map 700 that excludes nodes of an explored path. Map 700 is formed by removing all nodes along path $P_m$, with nodes omitted from map 700 represented using dashed lines. Data links that connect to and from the omitted nodes are also omitted in map 700 and represented with dashed lines. After omitting the nodes and data links associated with path $P_m$, only certain nodes and data links remain in map 700 from that of data network 100. In some implementations, map 700 may be constructed in an electronic memory when a greedy search is performed to find a set of lowest cost paths from source network node 102 to destination network node 116. In some implementations, map 700 may be constructed prior to performing the search (e.g., as a lookup table or other data structure that can be referenced to determine a graph that omits nodes and data links associated with a given path).

Map 700 may be used to analyze possible path extensions of path $P_m$. Two possible path extensions exist from terminal network node 108 of path $P_m$. The first possible path extension traverses data link 126 to network node 104. The second possible path extension traverses data link 130 to network node 110. The associated costs of data link 126 and data link 130, as well as any lexicographic tie breakers, may be used to determine which possible path extension is evaluated first. In some implementations, a possible path extension may be evaluated by determining whether a path exists in map 700 that reaches destination network node 116 from the network node at the end of the possible path extension. Such a path, by virtue of omitting the nodes of path $P_m$ in map 700, would be guaranteed not to form a loop with path $P_m$.

If data link 126 is evaluated as a possible path extension, network node 104 may be evaluated to determine whether a path exists in map 700 that reaches destination network node 116 from network node 104. Here, network node 104 can transmit data over three possible data links in data network 100: data links 120, 124, and 126. However, each of these data links have been omitted in map 700, since data links 120, 124, and 126 are connected to nodes of path $P_m$, i.e., network nodes 102, 106, and 108, respectively. This means that extending path $P_m$ to network node 104 would lead to forming a loop. If such a path extension is made, the costs associated with data links 120, 124, and 126 would then be evaluated to determine which data link is the next possible path extension. If the path is extended over data link 120, a loop would be formed that traverses from network node 102 over data links 122, 128, 126, and 120, back to network node 102. Similarly, if the path is extended over data link 124, a loop would be formed that traverses from network node 106 over data links 124, 128, and 126, back to network node 106. Finally, if the path is extended over data link 126, a loop would be formed that traverses from network node 108 to network node 104 and then back to network node 108. Therefore, since data links 120, 124, and 126 have been omitted in map 700, network node 104 cannot reach destination network node 116 without forming a loop. In this case, path $P_m$ is not extended along data link 126.

If data link 130 is evaluated as a possible path extension, network node 110 may be evaluated to determine whether a path exists in map 700 that reaches destination network node 116 from network node 110. Network node 110 can transmit data over three possible data links in data network 100: data links 130, 132, and 134. However, data link 130 has been omitted in map 700 because network node 108 is within explored path $P_m$. If data link 130 is traversed from network node 110 to network node 108, a loop would be formed, since data would be transmitted from network node 108 to network node 110 and then back to network node 110. Therefore, omitting data link 130 from map 700 ensures that any path found in map 700 from network node 110 to destination network node 116 does not form a loop with explored path $P_m$. Data links 132 and 134 provide valid routes to destination network node 116 from network node 110. If data link 132 is traversed, destination network node 116 can be reached by traversing data link 138, by traversing data links 136 and 140, etc. Similarly, if data link 134 is traversed, destination network node 116 can be reached by traversing data link 140, by traversing data links 136 and 138, etc. Therefore, traversing data link 130 is a valid path extension for path $P_m$.

Figure 8:
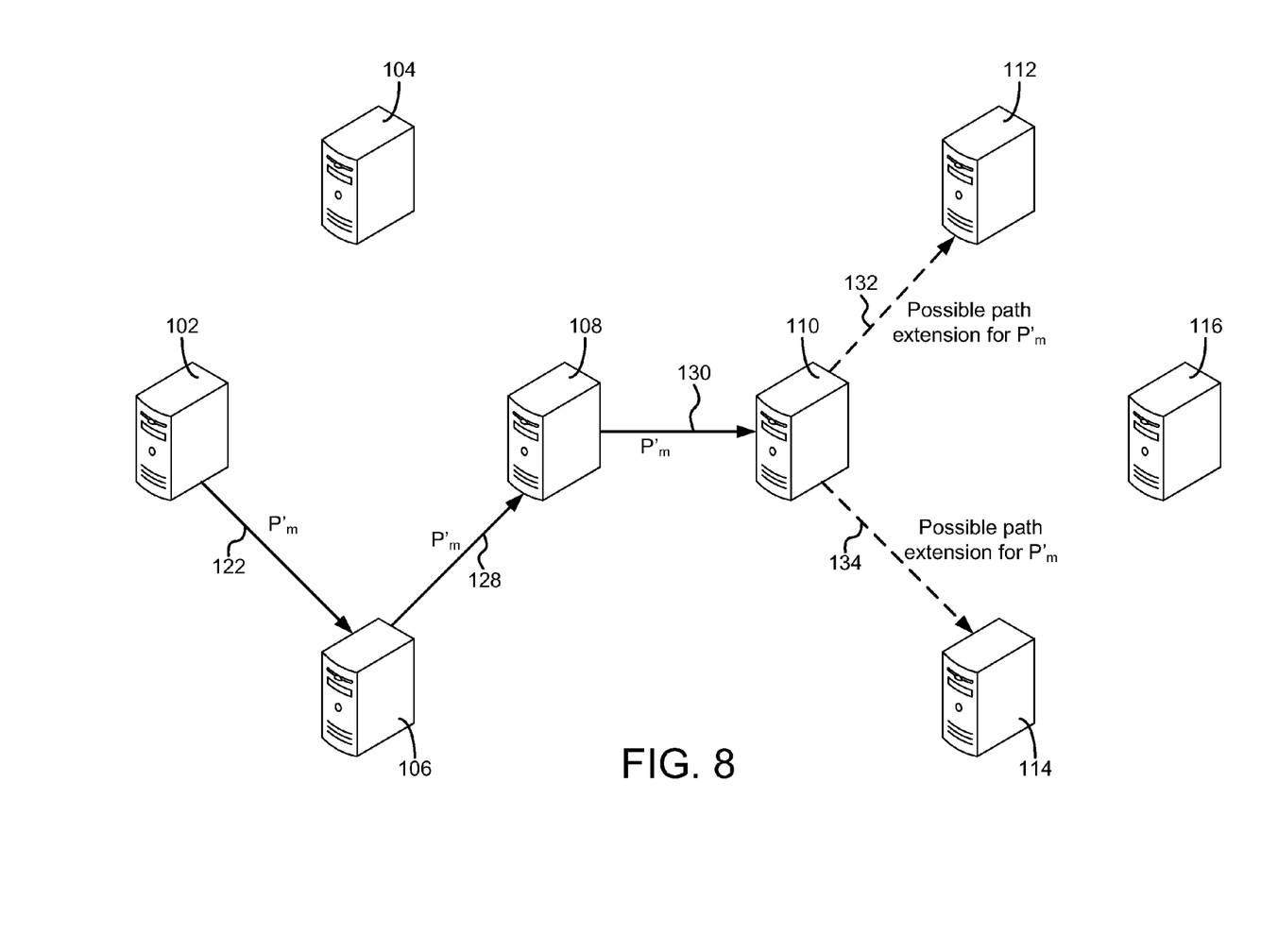
FIG. 8 is an illustration of an example of an explored path that has been extended.

FIG. 8 is an illustration of an example of an explored path $P_m'$ that has been extended. If data link 130 is a valid path extension for path $P_m$ (e.g., a path exists from network node 110 to destination network node 116 in map 700 of FIG. 7), path $P_m$ may be extended along data link 130 to form path $P_m'$. Data links 132 and 134 then become possible path extensions for path $P_m'$. Similar to map 700 of FIG. 7, a new graph may be generated that excludes the nodes and data links associated with path $P_m'$. Such a graph may be used to determine whether extending path $P_m'$ to either of network nodes 112 or 114 is a valid path extension. This process may be repeated until path $P_m'$ or a path having a lower cost than that of path $P_m'$ is extended to destination network node 116. Once path $P_m'$ or another path has been extended to destination network node 116, such a path is the next lowest cost path from source network node 102 to destination network node 116. Other explored paths may then be extended until no more possible path extensions exist or if the desired number of lowest cost paths from source network node 102 to destination network node 116 have been found.

Figure 9:
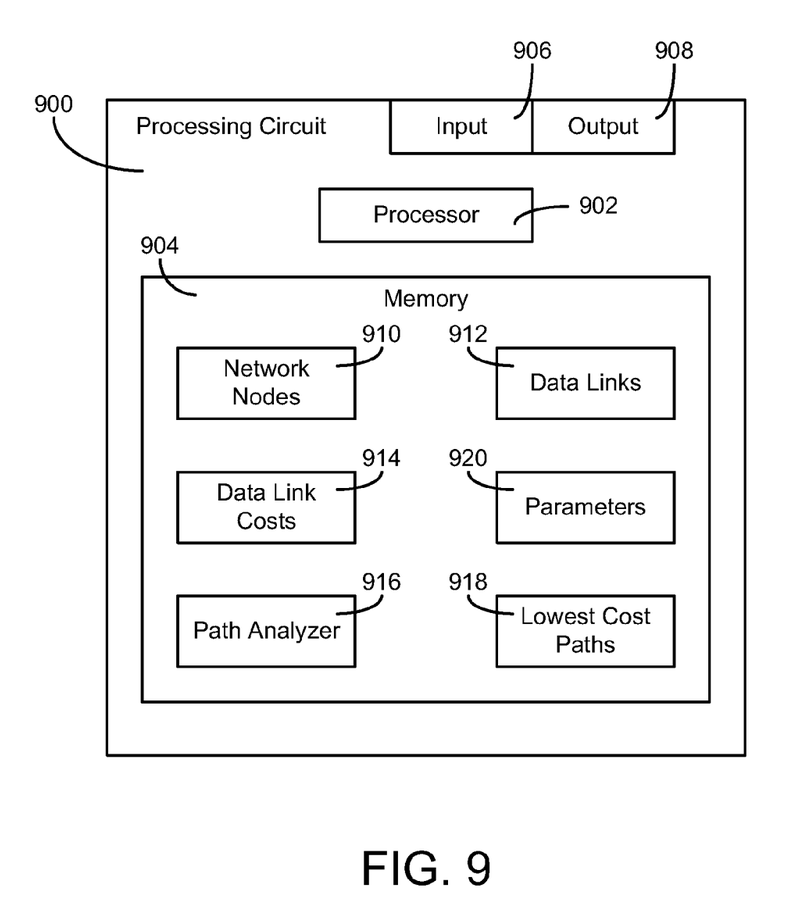
FIG. 9 is a schematic block diagram of a processing circuit configured to determine a set of lowest cost paths from a source network node to a destination network node for a data network.

FIG. 9 shows a detailed block diagram of a processing circuit 900. Processing circuit 900 may be within, for example, a network router, a server, or another device connected to a data network. Processing circuit 900 includes a processor 902 and a memory 904. Processor 902 may be or include one or more microprocessors, an application specific integrated circuit (ASIC), a circuit containing one or more processing components, a group of distributed processing components, circuitry for supporting a microprocessor, or other hardware configured for processing. Processor 902 is also configured to execute computer code stored in memory 904 to complete and facilitate the activities described herein. Memory 904 can be any volatile or non-volatile computer-readable medium capable of storing data or computer code relating to the activities described herein. For example, memory 904 is shown to include path analyzer 916, which may be implemented using computer code (e.g., executable code, object code, source code, script code, machine code, etc.) configured for execution by processor 902. When executed by processor 902, processing circuit 900 is configured to complete the activities described herein.

Processing circuit 900 also includes hardware circuitry for supporting the execution of the computer code path analyzer 916. For example, processing circuit 900 may include hardware interfaces (e.g., an output 908) for communicating a set of lowest cost paths 918 (e.g., a set of lowest cost paths from a source network node to a destination network node) to other computing devices (e.g., another router, another server, a mobile device, etc.). Processing circuit 900 may also include an input 906 for receiving, for example, a set of network nodes 910, data links 912, data link costs 914, and/or parameters 920 from other computing devices.

Memory 904 includes network nodes 910, which represent the set of network nodes in the data network to be analyzed. Network nodes 910 may include, for example, information representative of a set of data centers, routers, servers, or other electronic devices configured to receive and/or transmit data via the data network. In some implementations, network nodes 910 may be a partial set of the network nodes of the data network. For example, certain nodes on the data network may be excluded from analysis by path analyzer 916 when the set of lowest cost paths from a source network node to a destination network node is determined.

Memory 904 includes data links 912, which represent links of the data network over which two or more network nodes communicate. Data links 912 may include, for example, information representative of the two or more data nodes (e.g., a set of pointers to network nodes 910, a list of unique identifiers of network nodes 910, etc.) for a given data link. Data links 912 may also include information indicative of a direction of data flow over a link. For example, data links 912 may be unidirectional or bidirectional, depending on the configuration of the data network. If data can travel in two over more directions, each direction of flow may be represented separately in data links 912, in some implementations. For example, the connection from node A to node B may be stored as a separate data link in data links 912 than that of the connection from node B to node A.

Memory 904 includes data link costs 914, which are associated with data links 912. Data link costs 914 may be one or more metrics or characteristics of data links 912. For example, the latency, bandwidth, financial cost, physical distance, or other information associated with data links 912 may be stored in data link costs 914. In one implementation, the roundtrip ping times over data links 914 may be stored in memory 904 as data link costs 914. In further implementations, data link costs 914 may be based on available bandwidth, financial cost, affinities, any other configurations or performance metrics associated with data links 912, or any combination thereof. Data link costs 914 may be received from one or more other processing circuits via input 906 or determined by processing circuit 900, according to various implementations.

Memory 904 includes parameters 920. Parameters 920 are used to control the operation of processing circuit 900. Parameters 920 may include one or more data values that cause processing circuit 900 to operate differently, depending on the data values. For example, parameters 920 may include a selection of a source network node and a destination network node received via input 906. These may be used by path analyzer 916 to generate different sets of lowest cost paths 918 between the source network node and the destination network node. In another example, parameters 920 may include a selection of how many lowest costs paths are to be determined by path analyzer 916 (e.g., the two lowest cost paths, the three lowest cost paths, etc.). In a further example, parameters 920 may include a parameter that controls whether or not path analyzer 916 excludes loops from lowest cost paths 918. Other examples of parameters 920 include parameters that control how often the sets of lowest cost paths 918 are generated, how the sets of lowest cost paths 918 are used, and whether certain members of network nodes 910 or data links 912 should be excluded from analysis by path analyzer 916 when determining lowest cost paths 918. For example, a particular network node in network nodes 910 may be down for maintenance for a certain amount of time. In such a case, a parameter in 920 may be utilized to exclude paths in lowest cost paths 918 that traverse that particular network node.

Memory 904 includes a path analyzer 916. Path analyzer 916 utilizes the selected source network node and destination network node in parameters 920, network nodes 910, data links 912, and data link costs 914, to generate lowest cost paths 918. In some implementations, path analyzer 916 may use network nodes 910, data links 912, and data link costs 914 to generate a set of lowest cost paths from each of network nodes 910 to a destination network node. The set of lowest cost paths from each network node 910 to the destination network node may be generated, for example, using a single-source shortest path search strategy between each network node and the selected destination network node. Path analyzer 916 may also use the generated set to determine path deviation costs to reach the destination network node from the source network node. Since the set of shortest paths from network nodes 910 to the destination network node includes the lowest cost path from the source network node to the destination network node, any path that deviates from this will have an equal or greater cost. These costs may then be used by path analyzer 916 to determine other paths from the source network node to the destination network node. In some implementations, path analyzer 916 may employ a greedy search strategy or other search strategy to determine whether an explored path should be extended.

Path analyzer 916 may determine whether a path extension is valid for an explored path. In some implementations, a path extension (e.g., a data link appended to the explored path) may be valid if the extended path would be able to reach the destination network node without forming a loop with the explored path. If a path extension is not valid, the explored path may not be extended along the data link. However, if the path extension is valid, the path extension may be appended to the explored path. The node at the end of the appended data link would then become the new terminal network node for the extended path. Data links that stem from the new terminal network node may then be used as potential path extensions for the extended path. This process may be repeated by path analyzer 916 until no more potential path extensions exist or a specified number of lowest cost paths from the source network node to the destination network node have been found.

In some implementations, path analyzer 916 may utilize a map of network nodes that omits the nodes of an explored path to determine whether a path extension is valid. For example, the map may contain some or all of the network nodes in the data network that are not traversed by the explored path. The map may also contain some or all of the data links of the data network that do not reach or stem from the nodes in the explored path. Path analyzer 916 may use the map that omits the explored path to determine whether a path exists from the node of the path extension to the destination network node. If such a path does not exist in the map that omits the explored path, then the path extension is not appended to the explored path, thereby ensuring that lowest cost paths 918 contains only loopless paths between the source network node and the destination network node. In some implementations, the map that excludes the explored path may be predetermined (e.g., stored in network nodes 910 and data links 912, received via input 906, etc.). In some implementations, the map that omits the explored path may be determined by path analyzer 916, as necessary (e.g., as part of the determination as to whether a path extension is valid).

Path analyzer 916 generates lowest cost paths 918 and stores them within memory 904. Lowest cost paths 918 includes a plurality of paths from the source network node to the destination network node that are determined by path analyzer 916 to have the lowest associated costs. The number of paths between the source and destination in lowest cost paths 918 may be controlled by one or more values in parameters 920. For example, lowest cost paths 918 may include the five lowest cost paths between the source and destination network nodes. In some implementations, lowest cost paths 918 may include sets of other lowest costs paths between different source and/or destination network nodes. For example, lowest cost paths 918 may include a set of lowest cost paths from a source network node to a first destination network node and a set of lowest cost paths from the source network node to a different destination network node.

Lowest cost paths 918 may also be used to make routing decisions in the data network. For example, processing circuit 900 may provide lowest cost paths 918 to routers or other devices in a data network via output 908. In another implementation, processing circuit 900 may use lowest cost paths 918 to determine where data is to be sent from processing circuit 900. For example, processing circuit 900 may receive a request via input 906 to send data to another device via output 908 and utilize lowest cost paths 918 to determine how the data is to be sent to the other device.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. For example, while certain implementations are described herein with respect to routing data in a data network, the methodologies described could also be applied to other areas, such as determining the best routes of a map that may be traveled by a person or vehicle. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   retrieving, from a memory, map data identifying a plurality of network nodes and a plurality of data links between the network nodes, wherein each data link has an associated cost;
   receiving an identification of a source network node and a destination network node in the plurality of network nodes;
   determining, by a processing circuit, a set of respective singlemost lowest cost paths between the destination network node and each other network node of the plurality based in part on the associated costs of the plurality of data links;
   determining, by the processing circuit, a set of explored paths based in part on the difference between the map data and the set of respective singlemost lowest cost paths between the plurality of network nodes and the destination network node; and
   determining, by the processing circuit, a set of at least two lowest cost paths from the source network node to the destination network node by extending one or more of the explored paths based in part on whether one of the plurality of data links is a valid path extension for an explored path.

2. The method of claim 1, wherein one of the plurality of data links is determined to be a valid path extension based in part on whether a path exists from the extended path to the destination network node without forming a loop with the explored path.

3. The method of claim 2, wherein the one of the plurality of data links is determined to be a valid path utilizing map data that does not include one or more nodes in the explored path.

4. The method of claim 1, wherein paths are explored in order of associated cost and lexicographic order.

5. The method of claim 1, further comprising utilizing the set of at least two lowest cost paths to route data from the source network node to the destination network node.

6. The method of claim 1, further comprising storing, within the memory, a plurality of sets of at least two lowest cost paths between a plurality of source network nodes and destination network nodes.

7. A processing circuit configured to retrieve map data identifying a plurality of network nodes and a plurality of data links between the network nodes, wherein each data link has an associated cost, wherein the processing circuit is further configured to:
   receive an indication of a source network node and a destination network node in the plurality of network nodes;
   determine a set of respective singlemost lowest cost paths between the destination network node and each other network node of the plurality based in part on the associated costs of the plurality of data links;
   determine a set of explored paths based in part on the difference between the map data and the set of respective singlemost lowest cost paths between the plurality of network nodes and the destination network node; and
   determine a set of at least two lowest cost paths from the source network node to the destination network node by extending one or more of the explored paths based in part on whether one of the plurality of data links is a valid path extension for an explored path.

8. The processing circuit of claim 7, wherein one of the plurality of data links is determined to be a valid path extension based in part on whether a path exists from the extended path to the destination network node without forming a loop with the explored path.

9. The processing circuit of claim 8, wherein the one of the plurality of data links is determined to be a valid path utilizing map data that does not include one or more nodes in the explored path.

10. The processing circuit of claim 7, wherein paths are explored in order of associated cost and lexicographic order.

11. The processing circuit of claim 7, wherein the processing circuit is further configured to utilize the set of at least two lowest cost paths to route data from the source network node to the destination network node.

12. The processing circuit of claim 7, wherein the processing circuit is further configured to store a plurality of sets of at least two lowest cost paths between a plurality of source network nodes and destination network nodes.

13. The processing circuit of claim 7, wherein the processing circuit is further configured to provide, to another electronic device, the set of at least two lowest cost paths from the source network node to the destination network node.

14. One or more non-transitory computer-readable media having instructions stored therein, the instructions being executable by one or more processors to cause the one or more processors to perform operations comprising:
   receiving map data identifying a plurality of network nodes and a plurality of data links between the network nodes, wherein each data link has an associated cost;
   receiving an identification of a source network node and a destination network node in the plurality of network nodes;
   determining a set of respective singlemost lowest cost paths between the destination network node and each other network node of the plurality based in part on the associated costs of the plurality of data links;
   determining a set of explored paths based in part on the difference between the map data and the set of respective singlemost lowest cost paths between the plurality of network nodes and the destination network node; and
   determining a set of at least two lowest cost paths from the source network node to the destination network node by extending one or more of the explored paths based in part on whether one of the plurality of data links is a valid path extension for an explored path.

15. The one or more non-transitory computer-readable media of claim 14, wherein one of the plurality of data links is determined to be a valid path extension based in part on whether a path exists from the extended path to the destination network node without forming a loop with the explored path.

16. The one or more non-transitory computer-readable media of claim 15, wherein the one of the plurality of data links is determined to be a valid path utilizing map data that does not include one or more nodes in the explored path.

17. The one or non-transitory more computer-readable media of claim 14, wherein paths are explored in order of associated cost and lexicographic order.

18. The one or non-transitory more computer-readable media of claim 14, wherein the operations further comprise utilizing the set of at least two lowest cost paths to route data from the source network node to the destination network node.

19. The one or non-transitory more computer-readable media of claim 14, wherein the operations further comprise storing a plurality of sets of at least two lowest cost paths between a plurality of source network nodes and destination network nodes.

20. The one or non-transitory more computer-readable media of claim 14, wherein the associated cost of each data link is based on a ping time between network nodes connected by the data link.

\* \* \* \* \*